April 18, 1939.　　S. B. GRIMSON ET AL　　2,154,898
METHOD OF AND APPARATUS FOR COLOR PHOTOGRAPHY
Filed April 2, 1937
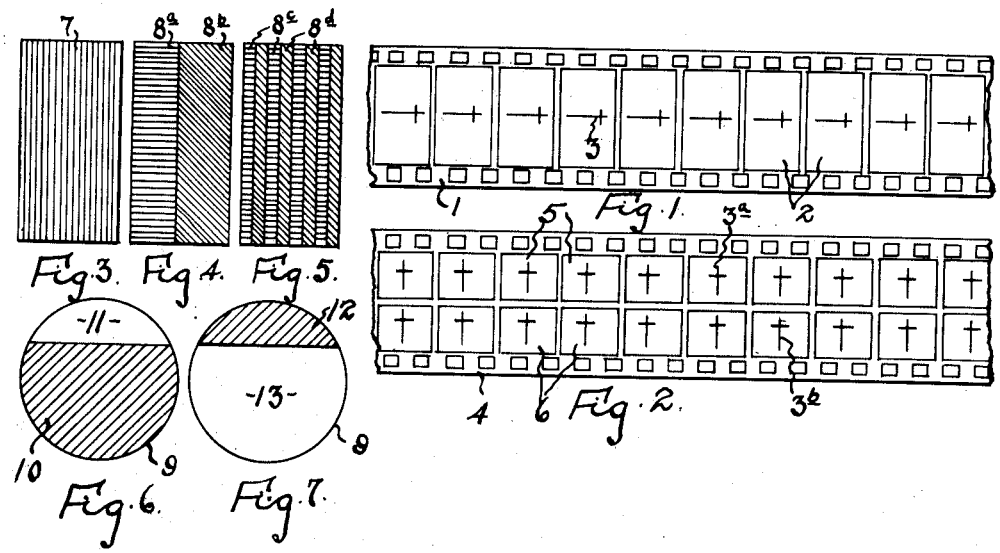
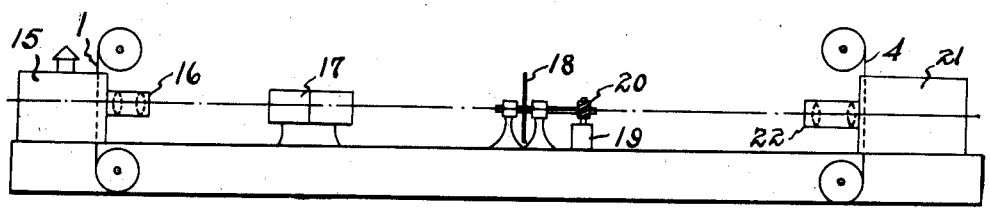
INVENTOR.
Samuel B. Grimson
Leo Lipp.
BY
ATTORNEYS Patented Apr. 18, 1939

2,154,898

UNITED STATES PATENT OFFICE 2,154,898

METHOD OF AND APPARATUS FOR COLOR PHOTOGRAPHY

Samuel B. Grimson, New York, and Leo Lipp, Flushing, N. Y., assignors to Color Research Corporation, New York, N. Y., a corporation of Delaware Application April 2, 1937, Serial No. 134,544

4 Claims. (Cl. 88—24)

This invention relates to improvements in methods of and apparatus for producing photographic film from which color pictures may be projected and for projecting them.

The invention is disclosed herein in connection with motion picture color-photography, but, as those skilled in the art will appreciate, it is not limited to this field of use.

An important object of this invention is the production of black and white motion picture film containing two color separation exposures to produce, when projected, a richly colored image in which there is accurate color balance.

A further object of this invention is to produce negative and positive motion picture film adapted to the projection of colored images in which graininess is eliminated.

A further object of this invention is to provide film of the above type on which are color separation images, correctly exposed.

A still further object of the invention is to produce film of the above type in which substantially complete color separation is secured.

A still further object of the invention is the provision of apparatus by means of which film of this type may be produced.

These and many other objects as will appear from the following disclosure are secured by means of this invention.

This invention resides substantially in the combination, construction, arrangement, relative location of parts, steps, and series of steps, as well as the product, all in accordance with this disclosure.

In the accompanying drawing,

Figure 1 is an illustration of a piece of negative film produced in accordance with this invention;

Figure 2 is a similar view of a positive produced therefrom in accordance with this invention;

Figures 3, 4 and 5 are diagrammatic illustrations of filters employed during the projection of the film of this invention;

Figures 6 and 7 are diagrammatic views of the lens field of the projecting camera employed in preparing the positive from the negative; and Figure 8 is a diagrammatic view of suitable apparatus in accordance with this invention for producing the positive of Figure 2 from the negative of Figure 1.

A full appreciation of the advantages of this invention will be developed by a brief review of the present difficulties encountered in color-photography. Generally speaking, by the present methods the color negative is insufficiently exposed due to the fact that the light is divided over two or more separation negatives during taking. In such processes considerable difficulty is continually encountered in balancing the exposures on the separation negatives and in obtaining complete color separation on the negatives. Graininess in the negatives and prints produced therefrom is also clearly evident in the projected images. Finally, there is the difficulty of insufficient saturation in the projection filters necessitated by the lack of proper color separation in the positive. A general object of this invention is to eliminate all of these difficulties.

In accordance with the method herein, the scene to be photographed is taken through tricolor filters on a suitable lenticulated film such as, for example, the well known Kodacolor film, which is provided on one surface with a continuous series of lenticular elements and on its opposite face with a photographic emulsion. This film is developed after exposure by the Kodacolor process. The image carried by the developed negative is black and white and has been termed a triple linear mosaic caused by the lenticular ridges on the film. Figure 1 illustrates such a negative comprising the film strip 1 on which are the exposed frames 2 in which there is displayed, for purposes of illustration and explanation, the image 3.

The negative film 1 is then projected by suitable means, such as the projector 15, through a suitable lens 16 onto a screen from which it is picked up by the camera 21 through a suitable lens system 22 onto the positive film 4. In order to eliminate graininess in the finished positive, it is preferable, in accordance with this invention, to project the images onto a finely-ground optically-flat glass plate 18 which is caused to rotate by means of a motor 19 and a gear train 20, diagrammatically illustrated. It is, of course, apparent to those skilled in the art that the supporting and operating mechanism for the ground glass disc 18 is at one side of the line of projection of the light so that the light is projected onto the disc 18 near its periphery without interference from this mechanism. Thus the projector 15 projects the images onto the ground glass disc 18 and the camera is arranged to pick the image up therefrom. By the use of this type of screen, graininess is largely eliminated.

Interposed between the projector 15 and the screen 18 is a right-angled prism 17 which is positioned to turn the images through an angle of 90°. The camera 21 is so placed as to receive the rotated image on one half of a frame. This may be accomplished either by properly positioning the camera or by employing a prism designed to move the image onto the desired position on the film. A mask is also preferably placed directly in front of the positive 4 to shield the other portion of the film. The lens system 16 is, of course, selected as would be well known so as to be suitable for projecting images from a lenticular film. The color filter commonly employed for such a lens system is, in accordance with this process, removed. The field of view 9 of the projecting lens system 16 is masked, as illustrated in Figures 6 and 7, in exposing the positive film 4. Thus, if it is desired to first project the red image of the negative onto the positive film 4, the field of view 9 of the projection lens system 16 is masked off by a mask 10, leaving only the area 11 open. This mask is constructed and positioned so as to mask off that part of the field of the projection lens system through which the lenticulations of the negative throw the blue and green images so that the portion of each frame of the positive film exposed at this time receives only the red image through the area 11.

The films are then wound back and a mask 12 applied to the projection lens system to leave unobstructed the area 13 through which the blue and green images are thrown by the lenticulated film. The films are again run through, with the camera 21 shifted and properly positioned or a suitable prism employed so as to expose the other half of each frame to the blue and green images through the unobstructed areas of the lens field. The mask in front of the film 4 is shifted to shield the previously exposed portion and uncover the unexposed portion. The film 4, being on ordinary film producing black and white images, is developed in accordance with well known practice.

The finished positive print is illustrated at 4 in Figure 2. In this case each frame of the negative has been rotated 90° and printed twice on the positive to produce two series of frames 5 and 6, one representing the red separation negative and the other the blue-green separation negative in which it will be seen that the printed images 3a and 3b corresponding to the original image 3 have been rotated 90°.

It is noted that it has heretofore been proposed to provide a film with two or more complete images photographed through light filters to give separation negatives of a desired scene. This film is produced by means of a light beam splitter provided with color filters to obtain the double image but has not attained real success because of the difficulties enumerated above and particularly the difficulties of getting complete color separation negatives with correct color balance.

An important advantage of this method is that by varying the relative exposures of the color separation negatives during printing a perfect color balance of a picture produced by such a positive film is secured. In projecting this film, it, of course, must be projected through a lens system capable of superimposing the two series of images through color filters on a screen.

In projection in accordance with this invention better color balance results from the use in combination with the positive print of this invention of tri-color filters arranged so that the tri-color red filter, as shown at 7 in Figure 3, is employed for projecting the red positive image, and for the projection of the blue-green image a filter area equivalent in size to the red filter is provided, one-half of which is composed of the tri-color blue and the other half of the tri-color green, arranged either in solid areas, as indicated at 8a and 8b in Figure 4, or split up as desired, as indicated at 8c and 8d in Figure 5. It is, of course, understood that the red filter may be combined with a neutral density filter adapted to reduce the red illumination to the desired point of balance with the green and blue. This result may also be obtained by the use of balanced filters of suitable transmission and it is not intended to limit the invention to use with the conventional tri-color filters.

It is also to be understood that the invention is not limited to the use of lenticulated film in photographing the original scene since it may be photographed on a line-screen negative and the positive prints made with suitable color screens in place of masks.

The invention is obviously not limited to the production of a positive print in the optical printer of Figure 8, but a master negative bearing the two series of images may be produced from the positive either by contact or optical printing from which any desired number of positive prints may be made.

It will be clear to those skilled in the art that by this method it is possible to provide positive prints developed to a gamma allowing the use of projection filters capable of showing rich color in the projected image on a screen.

We are, of course, aware that those skilled in the art will appreciate and readily understand the numerous detailed variations both in the apparatus and the procedure disclosed without departing from the novel scope and subject matter of this disclosure. It is our desire not to be limited, therefore, to the exact disclosure as given with a view to describing and illustrating the invention but we intend only to be limited by the scope of the claims granted us.

What we claim is:

1. A method of producing a black and white color positive film, which comprises projecting images from a developed lenticulated negative onto a revolving ground glass screen, masking a portion of the projected beam to form a red image on the moving screen, photographing the red image upon a portion of an unexposed positive film, masking another portion of the projected beam to form a blue-green image on the moving screen, photographing the blue-green image upon another unexposed portion of the positive film, and developing the positive film.

2. A method of producing a black and white color positive film, which comprises projecting images from a developed lenticulated negative onto a revolving ground glass screen in a rotated position, masking a portion of the projected beam to form a red image on the moving screen, photographing the red image upon a portion of an unexposed positive film, masking another portion of the projected beam to form a blue-green image on the moving screen, photographing the blue-green image upon another unexposed portion of the positive film, and developing the positive film.

3. A method of producing a black and white color positive film, which comprises projecting images from a developed lenticulated negative onto a revolving ground glass screen, masking a portion of the projected beam to form an image of one color on the screen, photographing that image upon a portion of an unexposed positive film, masking another portion of the projected beam to form an image of another color on the screen, photographing the other image upon another unexposed portion of the positive film, and developing the positive film.

4. A method of producing a positive print, which comprises projecting the images from a lenticulated color negative onto a screen, rotating the projected beam through an angle of 90° before it strikes the screen, photographing the images from the screen onto an unexposed negative while masking a portion of the beam to produce a blue-green image on the negative, again photographing the images projected onto the screen while masking another portion of the beam to produce a red image on the negative, developing the negative, and rotating the screen during the photographing steps.

SAMUEL B. GRIMSON.
LEO LIPP.